(12) United States Patent
Brown

(10) Patent No.: US 7,981,242 B2
(45) Date of Patent: Jul. 19, 2011

(54) PRINTED VULCANIZED FIBRE-BASED PRODUCT AND PROCESS FOR MAKING THE SAME

(75) Inventor: Watson F. Brown, Wilmington, DE (US)

(73) Assignee: ele Associates Global LLC, Landenberg, PA (US)

( * ) Notice: Subject to any disclaimer, the term of this patent is extended or adjusted under 35 U.S.C. 154(b) by 517 days.

(21) Appl. No.: 11/956,549

(22) Filed: Dec. 14, 2007

(65) Prior Publication Data
US 2008/0156432 A1   Jul. 3, 2008

Related U.S. Application Data

(62) Division of application No. 10/979,627, filed on Nov. 2, 2004, now Pat. No. 7,329,455.

(60) Provisional application No. 60/531,440, filed on Dec. 18, 2003.

(51) Int. Cl.
| | |
|---|---|
| B41M 5/00 | (2006.01) |
| C09J 5/02 | (2006.01) |
| B29C 65/02 | (2006.01) |
| B32B 37/14 | (2006.01) |
| B32B 3/02 | (2006.01) |
| B44C 5/04 | (2006.01) |
| B29C 65/56 | (2006.01) |
| B29C 65/72 | (2006.01) |
| B44C 3/00 | (2006.01) |

(52) U.S. Cl. .......... 156/307.3; 156/277; 156/307.1; 156/307.4; 156/307.7; 428/199; 428/211.1; 428/300.1

(58) Field of Classification Search .......... 156/277, 156/307.1, 307.3, 307.4, 307.7; 428/106, 428/109, 199, 211.1, 300.1, 535, 537.1
See application file for complete search history.

(56) References Cited

U.S. PATENT DOCUMENTS

| | | | |
|---|---|---|---|
| 3,502,533 | A | 3/1970 | Reiss |
| 3,769,143 | A | 10/1973 | Kulesza |
| 3,935,047 | A | 1/1976 | Shinomura et al. |
| 4,310,581 | A | 1/1982 | Felter et al. |
| 4,473,613 | A | 9/1984 | Jaisle et al. |
| 4,713,299 | A | 12/1987 | Taylor et al. |

(Continued)

FOREIGN PATENT DOCUMENTS

| | | |
|---|---|---|
| DE | 7421399 | 9/1975 |
| GB | 1501205 | 2/1978 |
| GB | 2124911 | 2/1984 |
| JP | 2003181996 | 7/2003 |

OTHER PUBLICATIONS

Abstract of DE-7421399. European Patent Office (EPO), Sep. 4, 1975.*

*Primary Examiner* — Sonya Mazumdar
(74) *Attorney, Agent, or Firm* — Connolly Bove Lodge & Hutz LLP

(57) ABSTRACT

A three-ply product includes a particle board core assembled with a patterned vulcanized fiber sheet or layer on each surface. One of the vulcanized fiber sheets may have a preprinted decorative pattern provided thereon. The other vulcanized fiber sheet may also be decorative, or merely a plain sheet of vulcanized fiber. The product is useful for woodworking applications, and may be processed (i.e., stained, sanded, lacquered, etc.) like a natural wood product. Unlike prior vulcanized fiber processes, the process of making the vulcanized fiber sheets preprints a pattern, in a preprinting process, on the top sheets of cellulose paper plies.

10 Claims, 1 Drawing Sheet

U.S. PATENT DOCUMENTS

| | | |
|---|---|---|
| 4,822,440 A | 4/1989 | Hsu et al. |
| 4,849,768 A | 7/1989 | Graham |
| 5,526,102 A * | 6/1996 | Kato ............................ 399/302 |
| 5,827,788 A | 10/1998 | Miyakoshi et al. |
| 6,217,694 B1 * | 4/2001 | Taniguchi .................... 156/235 |
| 6,280,820 B1 | 8/2001 | Martino |
| 2001/0046594 A1 | 11/2001 | Takemoto |
| 2002/0168503 A1 | 11/2002 | Dong et al. |
| 2003/0041962 A1 | 3/2003 | Johnson et al. |
| 2004/0086678 A1 | 5/2004 | Chen et al. |

* cited by examiner

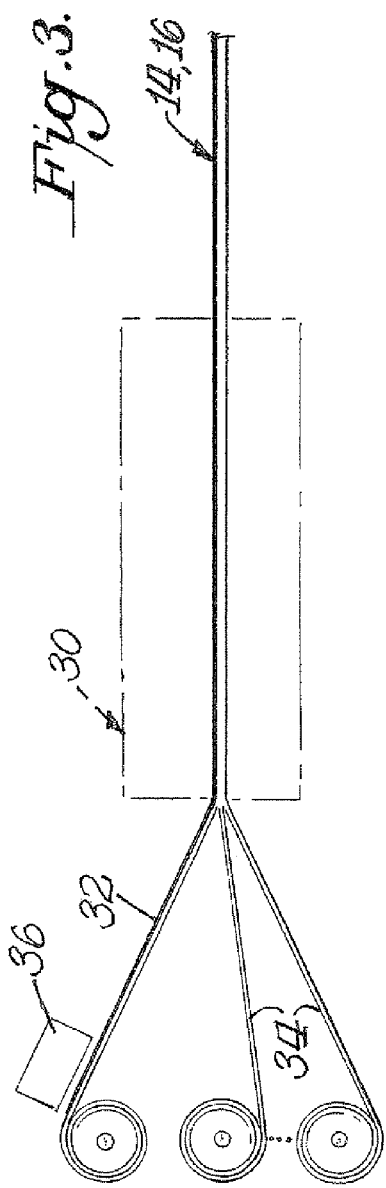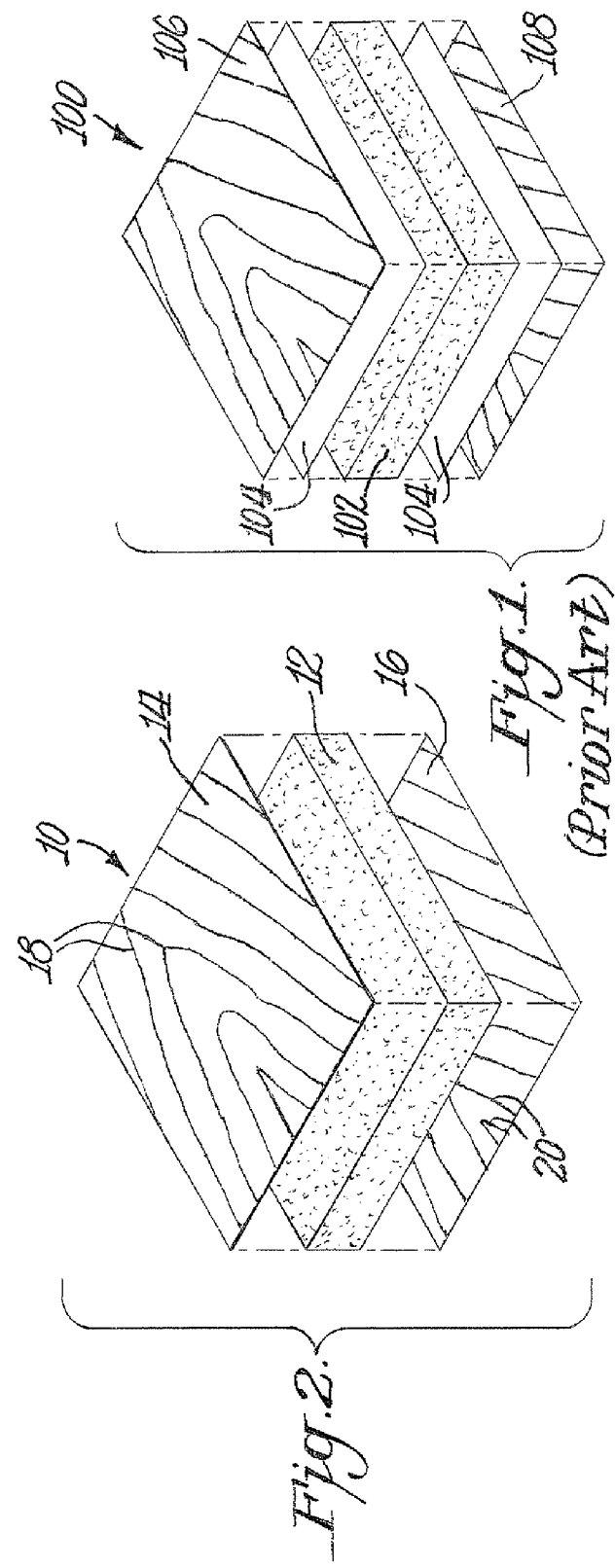

PRINTED VULCANIZED FIBRE-BASED PRODUCT AND PROCESS FOR MAKING THE SAME

CROSS-REFERENCE TO RELATED APPLICATIONS

This application claims priority under 35 U.S.C. §120, and is a divisional application of U.S. patent application Ser. No. 10/979,627, filed Nov. 2, 2004, now U.S. Pat. No. 7,329,455, which claims benefit under 35 U.S.C. §119(e) of provisional U.S. Patent Application No. 60/531,440, filed Dec. 18, 2003.

BACKGROUND OF THE INVENTION

A. Field of the Invention

The present invention relates generally to the hot pressing of layers of natural or reconstituted wood products as in the manufacture of pressed wood panels for furniture making, and, more particularly, to a printed vulcanized fibre-based product and process for making the same.

B. Description of the Related Art

Vulcanized cellulose fibre is well-suited as a cross band and face veneer material for wood paneling. Vulcanized fibre has extremely high tensile strength in all directions so that a thin vulcanized fibre can be used to securely anchor wooden sheets or veneers in place. Moreover, its cellulosic nature is highly compatible with wood so that splitting and checking of the face veneers are eliminated.

Vulcanized fibre can vary in thickness from about 0.25 millimeters to about 0.80 millimeters, and preferably are colored with pigments to match the colors of face veneers. Also these vulcanized fibres can be laminated from about two to about six very thin plies of cellular paper. The pigments are conveniently added to the beater stock from which rolls of paper are made, and no more than about 0.5% to about 2% pigment need be used, based on the dry weight of the fibre.

The papers used for making vulcanized fibre are formed continuously into rolls on Fourdrinier paper machines from 100% Kraft or sulfite pulp. Each roll preferably contains about 2.5 to about four ounces of fibre per square yard, based on the dry weight of the fibre.

The paper rolls are dried to a moisture content of about 2% to about 4%, then superimposed and fed in superimposed condition through the vulcanizing tank and then through the purification tanks, followed by drying. The vulcanizing treatment causes the superimposed plies to adhere to each other, and after the drying they will not delaminate. The purification tanks wash the vulcanizing chemical from the sheets. The laminate may then be calendared to a uniform thickness and smooth surface.

The vulcanized fibre web can be wound onto a roll or sheeted. At that stage, the web may be dry, that is have a moisture content of about 6% to 7%.

FIG. 1 is an isometric view of a conventional fancy face five-ply natural wood veneer-based panel 100. Panel 100 consists of a particleboard core 22 assembled with a cross band sheet 104 on each surface, and with wood veneer face sheets 106, 108 over each cross band sheet 104. Cross band sheets 104 may or may not be made from vulcanized fibre. One of the face sheets, for example, may be a decorative wood veneer sheet 106, as shown in FIG. 1, which contains a decorative wood grain pattern. The other face sheet 108 may also be decorative or merely a plain sheet of wood veneer.

The assembled items are then pressed between plates heated to about 275° F. and a pressure of about 150 pounds per square inch. The heat penetrates into the assembly to cure adhesive layers on the cross band sheets 104 after a few minutes, when the face sheets 106, 108 are no thicker than about 30 millimeters.

After sufficient time has elapsed, the press is opened and the cured panel 100 is removed. The edge faces of the cured panel 100 may then be edge-banded by cementing to them decorative or other face strips. Strips of a cross band sheet may be used for this purpose with the help of standard adhesives such as ethylene-vinyl acetate and polyamide hot melt adhesives used for edge banding. Cold-setting adhesives such as the usual urea-formaldehyde and polyvinyl acetate adhesives may also be used for this purpose as well as for cross banding if desired.

The core 102 of FIG. 1 is shown as a single piece as large as the panel, but it may be assembled from two or more pieces preferably cemented together as needed to make up the desired length and width. A particularly desirable arrangement has a particleboard core surrounded on its four edges with one or one-half inch wide strips of solid wood, and this is cross banded without requiring edge banding.

While the conventional fancy face five-ply natural wood veneer-based panel products offer many advantages over natural wood products, the five-ply products require significant manufacturing steps and do not offer the visual appearance of a natural wood product. Furthermore, conventional fancy face five-ply natural wood veneer-based panel products cannot be processed (i.e., stained, sanded, lacquered, etc.) like a natural wood product.

Thus, there is a need in the art for a cellulose-based product that overcomes the problems of the related art.

SUMMARY OF THE INVENTION

The present invention solves the problems of the related art by providing a three-ply product with wood grain pattern printing on the surface ply of vulcanized fibre, producing a manufactured veneer useful for woodworking applications. The product of the present invention may be processed (i.e., stained, sanded, lacquered, etc.) like a natural wood product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded perspective view of a conventional fancy face five-ply natural wood veneer-based panel;

FIG. 2 is an exploded perspective view of a three-ply product in accordance with the present invention and having printed vulcanized fibre layers that may be processed (stained, sanded, lacquered, etc.) like a natural wood product; and FIG. 3 is a schematic side elevational view showing the steps of preprinting a design on the surface of the layers to be converted into the vulcanized fibre product used in the three-ply panel shown in FIG. 2.

DETAILED DESCRIPTION OF EMBODIMENTS OF THE INVENTION

The following detailed description of the invention refers to the accompanying drawings, The same reference numbers in different drawings identify the same or similar elements.

Also, the following detailed description does not limit the invention. Instead, the scope of the invention is defined by the appended claims and equivalents thereof.

The present invention is drawn broadly to a three-ply product having preprinted vulcanized fibre layers, and is shown generally as reference numeral 10 in FIG. 2. Product 10 includes a particleboard core 12 assembled with a patterned vulcanized fibre sheet or layer 14, 16 on each surface. One of the vulcanized fibre sheets 14, for example, may have a preprinted decorative wood grain pattern 18 provided thereon. The other vulcanized fibre sheet 16 may also be decorative (i.e., have a preprinted wood grain pattern 20), or merely a plain sheet of vulcanized fibre, depending upon the application of the product 10. Preprinted patterns 18, 20 may be any desired pattern, depending upon the application of the product 10, such as, for example, wood grain of any type of wood, etc.

Vulcanized fibre sheets 14, 16 may be provided with a conventional adhesive layer on the sides facing core 12. Core 12 and vulcanized fibre sheets 14, 16 may then be pressed between plates heated to about 275° F. and a pressure of about 150 pounds per square inch. The heat penetrates into the assembly to cure the adhesive layers on vulcanized fibre sheets 14, 16 after a few minutes.

After sufficient time has elapsed, the press is opened and the cured product 10 is removed. The edge faces of the cured product 100 may then be edge banded by cementing decorative or other face strips. Strips of material prepared the same way as vulcanized fibre sheets 14, 16 may be used for this purpose with the help of standard adhesives such as ethylene-vinyl acetate and polyamide hot melt adhesives used for edge banding. Cold-setting adhesives such as the usual urea-formaldehyde and polyvinyl acetate adhesives may also be used for this purpose if desired.

The core 12 of FIG. 2 is shown as a single piece as large as the panel, but it may be assembled from two or more pieces preferably cemented together as needed to make up the desired length and width. A particularly desirable arrangement has a particleboard core 12, but core 12 may be made from other materials as well, such as, for example, medium density fiberboard, laminated plywood, etc.

The process for forming vulcanized fibre sheets 14, 16 may be the same as the conventional process described above, except that the top portions or layers of vulcanized fibre sheets 14, 16 are preprinted with a pattern 18, 20 prior to being subjected to the vulcanized fibre process. Furthermore, the top layers of vulcanized fibre sheets 14, 16 do not need an adhesive because sheets 14, 16 are not cross band sheets, but rather the top layer of product 10.

The process for forming vulcanized fibre sheets 14, 16 of the present invention is shown generally in FIG. 3 as reference numeral 30. The vulcanized fibre forming process 30 converts a cellulose paper material into a unique laminate product with an unusual combination of physical and chemical properties. The cellulose paper is transformed into a material that possesses increased strength and durability.

Vulcanized fibre is a laminate of cellulose paper plies. The raw material is one-hundred percent wood cellulose which is then manufactured into an unsized, saturating grade paper. The wood cellulose is a high alpha pulp. Unlike prior vulcanized fibre forming processes, the process 30 of the present invention preprints a pattern 18, 20, in a preprinting process 36, on the top sheets 32 of cellulose paper plies. A plurality of bare (not preprinted with a pattern) cellulose paper plies 34 may also be supplied to vulcanized fibre forming process 30 to achieve different thicknesses.

Preprinting process 36 may include a variety of printing technologies. For example, preprinting process 36 may include rotogravure printing, which is a continuous print process using permanent light-fast dyes and pigments on chrome etch drum rolls. The pattern 18, 20 may be etched on the drum rolls and transferred to cellulose paper plies 32. The durability of the printed surface of cellulose paper plies 32 is significantly enhanced through the vulcanized fibre forming process 30. When this preprinting process is used to produce vulcanized fibres 14, 16, a product that can be sanded, stained, painted, lacquered, etc. is created.

Another exemplary preprinting process 36 may include ink jet digital printing, preferably from a digital pattern file and in wide format, using archival-quality inks, dyes, and pigments that penetrate cellulose paper plies 32. This produces a print pattern through the thickness of cellulose paper plies 32. When this preprinting process is used to produce vulcanized fibres 14, 16, a product that can be sanded, stained, painted, lacquered, etc. is created.

Alternatively, although not preferred, instead of preprinting cellulose paper plies 32 prior to vulcanized fibre forming process 30, vulcanized fibres 14, 16 may be patterned after the vulcanized fibre forming process 30. Such a post-printing process preferably includes screen printing the top surfaces of vulcanized fibres 14, 16 with either a coating or a dye stain. Like the ink jet printing process, the screen printing process may use a digital pattern file.

A digital pattern file used in the ink jet printing process or the screen printing process includes a digital file capable of being stored on a conventional computing device. Examples include digital files having a TIF, BMP, JPG, GIF, PCX, PNG, LZW, DCX, FPX, etc. file format. The digital file will include software code that stores the pattern in a digital format on the computing device. Different digital files, and thus patterns, may be easily retrieved from the computing device in a conventional manner and used in the printing process 36 of the present invention. Furthermore, any type of wood may be scanned and digitized to produce digital pattern files for any type of wood.

The computing device includes a bus interconnecting a processor, a read-only memory (ROM), a main memory, a storage device, an input device, an output device, and a communication interface. The bus is a network topology or circuit arrangement in which all devices are attached to a line directly and all signals pass through each of the devices. Each device has a unique identity and can recognize those signals intended for it. The processor includes the logic circuitry that responds to and processes the basic instructions that the computing device. ROM includes a static memory that stores instructions and date used by the processor.

Computer storage is the holding of data in an electromagnetic form for access by the computer processor. The main memory, which may be a RAM or another type of dynamic memory, makes up the primary storage of the computing device. Secondary storage of the computing device may comprise the storage device, such as hard disks, tapes, diskettes, Zip drives, RAID systems, holographic storage, optical storage, CD-ROMs, magnetic tapes, and other external devices and their corresponding drives.

The input device may include a keyboard, mouse, pointing device, sound device (e.g. a microphone, etc.), biometric device, or any other device providing input to the computing device. The output device may comprise a display, a printer, a sound device (e.g. a speaker, etc.), or other device providing output to the computing device. The communication interface may include network connections, modems, or other devices used for communications with other computer systems or devices.

In the vulcanized fibre forming process 30, cellulose paper plies 32, 34 are saturated with a concentrated zinc chloride solution. The zinc chloride is a catalyst that is not consumed in the process. The saturated cellulose paper plies 32, 34 then bond together. The zinc chloride is removed from the bonded cellulose paper plies or web through a series of water leaching tanks until the bonded cellulose paper plies have exchanged the zinc chloride with water to a purity of 0.05%. The zinc chloride may then be completely recycled through a recovery process.

The bonded web, which is now saturated with water after the purifying process, is then dried to a moisture content of about 5% to about 8%. It is during this drying step that the unique properties of the vulcanization process develop. The density of the bonded web increases two to three times as a result of shrinkage, typically ten percent in the machine direction, twenty percent in the cross direction, and thirty percent in the thickness. The final product, i.e., printed vulcanized fibres 14, 16, is one-hundred percent cellulose and may be in the form of sheets, rolls, etc. depending upon the application of printed vulcanized fibres 14, 16.

Printed vulcanized fibres 14, 16 have a density and physical strength properties greater than natural hardwoods. Vulcanized fibres 14, 16 contain no adhesives, resins, sizing, or binding agents. The present invention provides patterned printing to the saturated cellulose paper plies 32 before the vulcanized fibre process which incorporates the print pattern into a unique abrasion-resistant surface while maintaining the porous surface to accept stains and protective finishes typically used in natural wood products.

The process for forming the three-ply product of the present invention requires less processing steps than the conventional five-ply process, reducing manufacturing costs. The three-ply vulcanized fibre-containing product 10 of the present invention offers many other advantages over the conventional five-ply product. The product 10 of the present invention needs no cross banding to prevent checking or splitting, and has outstanding physical strength in all directions compared to wood veneers. Vulcanized fibres 14, 16 of the present invention may be produced up to four feet wide which eliminates joints in panel lay ups, have uniform patterns over large panels (up to four feet wide by any length), and may be cut into coils for edge banding requirements. Vulcanized fibres 14, 16 of the present invention may be sanded, and may accept stains, varnishes, adhesives, and paints just like natural woods. Cellulose paper plies 32, 34 of the present invention may have a base color to eliminate edge lines. Vulcanized fibres 14, 16 having thicknesses of about 0.25 to about 0.4 millimeters are flexible and conform to curves and bends for contouring applications. Vulcanized fibres 14, 16 having thicknesses of over 0.4 to about 0.8 millimeters may be molded with heat or steam for contouring applications. Vulcanized fibres 14, 16 of the present invention may be cut for decorative in-lays, or mechanically or chemically embossed or scored. The digital pattern files offer the ability to scan and print any rare or exotic wood pattern. Vulcanized fibres 14, 16 of the present invention may be sanded for high gloss finishing. Vulcanized fibres 14, 16 of the present invention provide limitless patterns for architectural designers, e.g., any pattern can be printed into vulcanized fibres 14, 16, and the color of vulcanized fibres 14, 16 may be modified, adjusted, and controlled. Vulcanized fibres 14, 16 are one-hundred percent cellulose, with no adhesives, solvents, or out-gassing of toxic fumes. Thus, waste disposal of vulcanized fibres 14, 16 is the same as wood. Finally, the wood fibre raw materials of vulcanized fibres 14, 16 are a renewable supply source, preventing endangerment of certain species of trees.

It will be apparent to those skilled in the art that various modifications and variations can be made in the three-ply vulcanized fibre-containing panels of the present invention and in construction of the three-ply vulcanized fibre-containing panels without departing from the scope or spirit of the invention, examples of which have been previously provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for making a vulcanized fibre having a preprinted decorative pattern provided thereon, comprising:
    preprinting a decorative pattern on a plurality of cellulose paper plies such that the pattern is incorporated into the plurality of cellulose paper plies; and
    subjecting the preprinted cellulose paper plies and a plurality of bare cellulose paper plies to a vulcanized fibre foaming process to form the vulcanized fibre having the preprinted decorative pattern.

2. A process as recited in claim 1, wherein the preprinting step comprises ink jet printing the decorative pattern.

3. A process as recited in claim 2, wherein the decorative pattern is stored as a digital pattern file.

4. A process as recited in claim 1, wherein the preprinting step comprises rotogravure printing the decorative pattern.

5. A process for making a cellulose-based product, comprising:
    providing a core; and
    providing at least one vulcanized fibre layer on at least one surface of the core, the vulcanized fibre layer having a decorative pattern incorporated within the fiber layer prior to vulcanization.

6. A process for making a cellulose-based product as recited in claim 5, further comprising:
    providing a vulcanized fibre layer on each of the top, bottom, and edge surfaces of the core, wherein each of the vulcanized fibre layers provided on the top and edge surfaces of the core has a preprinted decorative pattern provided thereon.

7. A process for making a cellulose-based product as recited in claim 6, wherein the vulcanized fibre layer provided on the bottom surface of the core has a preprinted decorative pattern provided thereon.

8. A process for making a cellulose-based product as recited in claim 5, further comprising:
    connecting the vulcanized fibre layer to the core with an adhesive.

9. A process for making a cellulose-based product as recited in claim 5, wherein the preprinted decorative pattern of the vulcanized fibre layer is formed using ink jet printing.

10. A process for making a cellulose-based product as recited in claim 5, wherein the preprinted decorative pattern of the vulcanized fibre layer is formed using rotogravure printing.

* * * * *